United States Patent

[11] 3,589,276

| [72] | Inventor | Sven Arild Swallert<br>Geneva, Switzerland |
|---|---|---|
| [21] | Appl. No. | 880,857 |
| [22] | Filed | Nov. 28, 1969 |
| [45] | Patented | June 29, 1971 |
| [73] | Assignee | AB Electrolux<br>Stockholm, Sweden |
| [32] | Priority | Nov. 27, 1968 |
| [33] | | Sweden |
| [31] | | 16203/68 |

[54] DESTRUCTION DEVICE FOR HOSPITALS
4 Claims, 1 Drawing Fig.

[52] U.S. Cl. .................................................. 100/90,
18/16 R, 21/61, 75/44 S, 100/38, 100/39, 100/92,
100/93 P, 100/97, 100/98 R, 100/104, 100/137,
100/218, 100/251, 100/269 R, 241/47, 241/99,
241/245, 241/259
[51] Int. Cl. ............................................... B30b 15/34
[50] Field of Search.......................................... 241/99,
245, .47, 259; 75/44 S; 264/109; 18/16 E, 16 R;
21/61; 100/90, 92, 93 P, 38, 39, 97, 98 R, 94, 95,
96, 104, 137, 218, 251, 269

[56] References Cited
UNITED STATES PATENTS
906,321  12/1908  Sperry .......................... 100/39 UX

| 2,059,229 | 11/1936 | Gregg | 100/39 |
| 2,978,999 | 4/1961 | Smith | 100/94 UX |
| 3,192,853 | 7/1965 | O'Connor | 100/90 X |
| 3,407,570 | 10/1968 | Steinmetz | 100/90 X |
| 3,426,673 | 2/1969 | Miner et al. | 100/39 X |
| 3,521,553 | 7/1970 | Smolka et al. | 100/218 X |

FOREIGN PATENTS

| 671,388 | 1963 | Canada | 100/93 |
| 581,844 | 1924 | France | 100/96 |
| 444,502 | 1949 | Italy | 100/97 |
| 735,471 | 1943 | Germany | 100/95 |

Primary Examiner—Billy J. Wilhite
Attorney—Waters, Roditi, Schwartz and Nissen

ABSTRACT: A destruction device for hospitals, especially for destruction of expendable articles made of e.g. glass, plastic material, paper and metal, comprising a grinding device for grinding the articles between mutually rotating discs into small particles, as powder, and passing the powder under the influence of centrifugal force to a device for heat sterilization of said powder and for compressing said sterilized powder to briquettes.

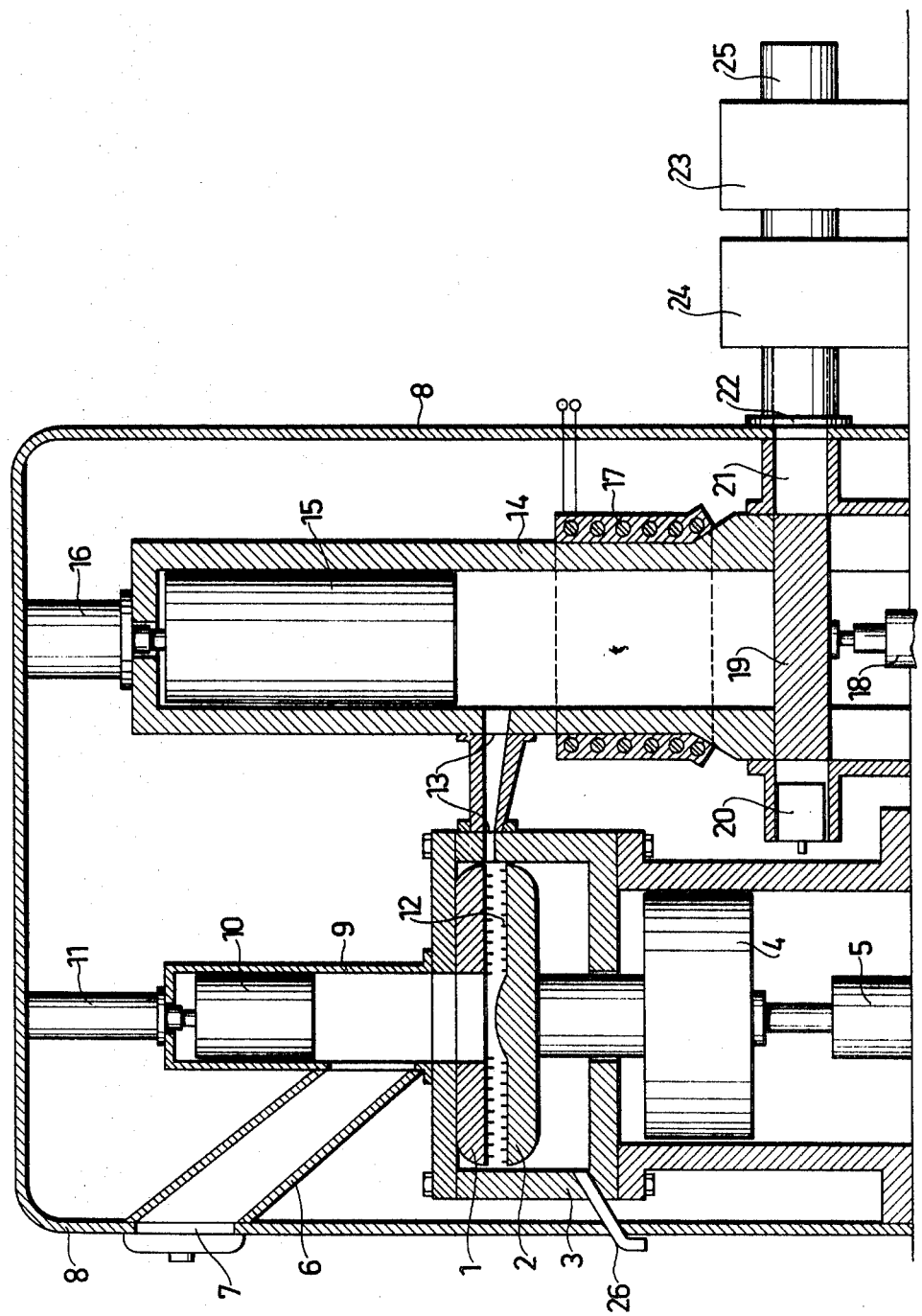

DESTRUCTION DEVICE FOR HOSPITALS

The present invention relates to a destruction device for hospitals, especially for destruction of throwaway or expendable articles, as articles made of glass, plastic material, paper and metal.

The increasing use of throwaway or expendable articles in hospitals causes much trouble in connection with collection, transport and destruction of consumed throwaway or expendable articles, which articles as a rule are to be considered as infected with bacteria and, thus, have to be handled in such a way that spreading of infections does not arise. Hitherto such articles usually have been burnt in big destructors outside the hospital area which, especially due to the big amount of plastic material included in expendable articles, causes serious inconveniences in that the destructors are subject to clogging caused by the plastic material and, hence, are to be cleaned frequently. Separation of the expendable articles with respect to plastic material is impracticable because the expendable articles usually consist of plastic material combined or laminated with metal, glass, paper etc. Moreover, the considerable amount of expandable bottles made of glass and included in the refuse of expendable articles renders the transportation of consumed expendable articles very extensive.

The object of the invention is to provide a destruction device, which can be used in the hospital, preferably in or in connection with a rinsing room of a hospital department, and which does not include means for destruction by fire.

This object has been realized by providing the destruction device according to the invention with a grinding device comprising two opposite discs rotating relative to each other and having each a grinding surface facing the grinding surface of the opposed disc, one of said discs having a central charging opening through which said articles are fed between said discs and are deformed by said discs and during grinding to small particles are moved under the influence of the centrifugal force to the periphery of said discs to a discharging opening which is adapted to open in a compressing device provided with a heating device, in which compressing device the particle-shaped material is heated to sterilization temperature and is compressed to form briquettes. By using a grinding device of this kind it is possible to rapidly disintegrate the expendable articles into small particles which then can be sterilized by the heating very rapidly and compacted to a handy briquette. Glass bottles and similar articles are rapidly grinded into a fine powder which is mixed with coarser particles of softer material, as especially particles consisting of plastic material which is brought to smelt and act as a binding agent in the briquettes.

An embodiment of the claimed destruction device is schematically illustrated in section in the accompanying drawing.

The device shown in the drawing comprises a grinding device having a fixedly mounted annular grinding disc 1 and a rotating, circular grinding disc 2, which discs are mounted in a housing 3. Grinding disc 2 is driven by an electric motor 4 which together with the grinding disc 2 is axially displaceable by means of a hydraulic ram 5. A charging tube 6 connects an opening 7 in a housing 8, which surrounds the destruction device, to an opening in the wall of a vertical cylinder 9. Said opening is located above the central opening in the annular grinding disc 1. In cylinder 9 a compacting piston 10 is slidingly movable operated by a hydraulic ram 11.

Articles fed down through tube 6 will be disintegrated to small particles by grinding between discs 1 and 2, the grinding surfaces of which face each other and are made of steel and, moreover, are provided with hard carbide teeth 12 having a height of about 1 to 5 mm. The particles are moved towards the periphery of the discs under the influence of centrifugal force and are thrown through an opening 13 of the wall of housing 3 into a compressing device consisting of a thick-walled cylinder 14 in which a piston 15 is movable, operated by a hydraulic ram 16. In the wall of cylinder 14 an electric heating device is mounted, for instance a winding 17, for heating the small particles collected in cylinder 14 to a temperature of about 200° C. to 300° C. The heating device alternatively may be of the microwave type.

The bottom of cylinder 14 consists of a hydraulic ram 18 operated plate 19 movable up and down and having a bottom position in which a finished briquette laying on plate 19 is positioned in line with and between a discharging device 20 and a discharging channel 21 opening out in an opening 22 in the housing 8.

In order to prevent infected air and dust from escaping out from the housing 8, this housing is connected to an evacuation fan 23 and a further heating device 24 for heating the air and the dust evacuated from housing 8 to a temperature of at least 300° C. after which the heated air and dust are exhausted through an exhaust opening 25.

Moreover, the housing 3 of the grinding device is provided with a drain pipe 26 for liquid, which is fed through the drain pipe to a device (not shown) for disinfection of the liquid.

The rotating disc 2 is adjustable in vertical direction by means of ram 5 to permit adjustment of the interspace between discs 1 and 2 to any desired value and, if desired, to permit displacement of disc 2 downwardly against the action of a predetermined pressure in ram 5.

The operation of the various rams is considered as routine work and, thus, has not been described in this specification.

A very important feature of the invention is to be seen in the supply of infected glass, paper, metal and plastic material articles in the form of a stream of very fine powder directly into the sterilization cylinder 14, in which the powder is sterilized extremely quickly as compared with the time required for the sterilization of the original articles, even if the articles are disintegrated before the sterilization operation by known methods used for reducing the volume of refuse.

Moreover, the volume of the briquettes produced is considerably reduced below the volume of the original articles, even if said articles are compressed at a very high pressure as compared with the pressure required for pressing of the briquettes.

I claim:

1. A destruction device for hospitals, especially for destruction of expendable articles, as articles made of glass, plastic material, paper and metal, comprising a grinding device including two cylindrical discs positioned coaxially with respect to each other and presenting two interspaced grinding surfaces facing each other, means to rotatably journal at least one of said discs, means to rotate said disc, a casing surrounding said discs, a charging opening in the central portion of one of said discs, and a discharging opening in said casing at the periphery of said interspace between said discs, a compressing device including a vertical cylinder, a bottom plate, a piston, means to move said piston up and down in said cylinder, a charging opening in the wall of said cylinder, means connecting said charging opening of said cylinder with said discharging opening of said casing, means to heat the interior of said cylinder, a discharging opening in the wall of said cylinder and means movable laterally across the interior of said cylinder in line with said discharging opening of said cylinder wall.

2. A destruction device as claimed in claim 1, wherein said grinding surfaces are provided with hard carbide teeth.

3. A destruction device as claimed in claim 1, comprising a housing surrounding said grinding device and said compressing device, means to evacuate air from said housing and means to heat the air evacuated from said housing to a sterilization temperature.

4. A destruction device as claimed in claim 3, wherein said grinding surfaces are provided with hard carbide teeth.